US006278549B1

(12) United States Patent
Gaebe

(10) Patent No.: US 6,278,549 B1
(45) Date of Patent: Aug. 21, 2001

(54) OPTICAL FILTER HAVING A QUARTZ SUBSTRATE

(75) Inventor: Carl E. Gaebe, Ellicott City, MD (US)

(73) Assignee: CIENA Corporation, Linthicum, MD (US)

(*) Notice: Subject to any disclaimer, the term of this patent is extended or adjusted under 35 U.S.C. 154(b) by 0 days.

(21) Appl. No.: 09/551,138

(22) Filed: Apr. 17, 2000

(51) Int. Cl.[7] .............................. G02B 1/10; G02B 5/26; G02B 5/28; H04J 14/02; B05D 5/06

(52) U.S. Cl. .................. 359/584; 359/124; 359/589; 427/164

(58) Field of Search ............................ 359/584, 586, 359/587, 589, 583, 580, 124; 427/164

(56) References Cited

U.S. PATENT DOCUMENTS 5,056,099 * 10/1991 Bradley ............................ 372/49
5,651,023 * 7/1997 MacKinnon ....................... 372/107

OTHER PUBLICATIONS

Takashashi, "Temperature Stability of Thin–Film Narrow–Bandpass Filters Produced by Ion–Assisted Deposition", Applied Optics, vol. 34, No. 4, 1995, pp. 667–675.

* cited by examiner

Primary Examiner—Jon Henry
(74) Attorney, Agent, or Firm—David L. Soltz

(57) ABSTRACT

An optical filter including a plurality of dielectric layers is provided on a quartz substrate. Quartz is advantageous as a substrate material because it has relatively low loss at wavelengths commonly used in telecommunication systems. Moreover, it is thermally and chemically stable, and has good adhesion to most dielectric films used as quarter and half wave layers. Further, quartz is mechanically tough, relatively inexpensive and readily available. The quartz substrate is cut from a crystal and has an orientation with reduced birefringence. In addition, the thickness of the quartz substrate is selected to reduce temperature-related shifts in the center wavelength of the filter.

29 Claims, 5 Drawing Sheets

OPTICAL FILTER HAVING A QUARTZ SUBSTRATE

FIELD OF THE INVENTION

The present invention is directed toward optical filters, in particular optical filters having a single crystal quartz substrate.

BACKGROUND OF THE INVENTION

Optical interference filters rely on principles of interference that modify reflected intensities of light incident on a surface. A familiar example of interference is the colors created when light reflects from a thin layer of oil floating on water. Briefly stated, by modifying the interface of a substance and its environment with a third material, reflectivity of the substance can be significantly altered. This principle is used in the fabrication of optical interference filters. These filters can be used as one of, or as the main filtering element in optical add/drop multiplexers, for example, employed in optical communication systems to select one or more channels from a transmission signal.

In its most simple form, an optical interference filter includes a reflective layer provided on a substrate. The reflection layer includes a cavity including two partial reflectors or mirror layers separated by a spacer. Each partial reflector, also referred to as a quarter-wave stack, includes alternating layers of high and low refractive index dielectric materials. Each of these layers has an optical thickness (defined as: physical thickness x refractive index) of a quarter-wavelength ($\lambda/4$), where $\lambda$ is a "center wavelength", i.e., the wavelength of light to be transmitted by the filter which is at the center of 3 dB bandwidth associated with the transmission spectrum of the filter. The spacer typically further includes at least one half-wave (or multiple half-wave) layer, and thus typically has twice the thickness of an individual quarter-wave layer. By appropriate choice of dielectric materials, the interference filter can be designed to transmit optical signals within a relatively narrow band about $\lambda$ through the reflection layer and the substrate, while wavelengths outside the band are reflected. Typically, many cavities are provided on a substrate.

A filter that reflects a desired wavelength while transmitting other wavelengths can also be constructed by forming a reflective layer with one or more cavities having appropriately selected thicknesses of the quarter and half wave layers.

Filters are typically manufactured by sputtering, for example, the quarter and half wave dielectric layers onto the substrate. The substrate must therefore have good adhesion to these dielectric layers. Moreover, since the filters are often critical components in telecommunications equipment and are frequently placed in harsh environments, the substrate should preferably have good mechanical strength as well as excellent chemical and atmospheric resistance. The substrates should also transmit light with little loss, and have a refractive index of 1.5 to 1.6 for use in optical communications systems carrying signals at wavelengths in the range of 1270 to 1670 nm. Further, the substrate should provide an effective coefficient of thermal expansion in the range of 9–13 ppm/C°. If Young's Modulus and Poisson's ratio are then taken into account, the filter will have relatively low wavelength dependence. (see, e.g., H. Takashashi, "Temperature Stability of Thin-Film Narrow-Bandpass Filters Produced By Ion Assisted Deposition", Applied Optics, vol. 34, no. 4, pp. 667–675 (1995).)

Many substrates are commercially available for incorporation into optical filters, but lack one or more of the criteria identified above. In particular, many commercially available substrates degrade or lose adhesion when exposed to relatively high temperatures and humidities.

SUMMARY OF THE INVENTION

Consistent with the present invention, an optical filter is provided comprising a single crystal or crystalline quartz (hereinafter referred to as "quartz") substrate and a reflective layer provided on the quartz substrate. In this arrangement, the reflective layer has an associated center wavelength, which is substantially independent of temperature.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

In accordance with the present invention, an optical filter includes a plurality of dielectric layers provided on a quartz substrate. Quartz is advantageous as a substrate material because it has relatively low loss at wavelengths commonly used in telecommunication systems, and is readily available. Moreover, it is thermally and chemically stable, and has good adhesion to most dielectric films used as quarter and half wave layers. Further, quartz is mechanically tough, relatively inexpensive and readily available.

Quartz, however, is a single crystal or crystalline material that is birefringent to light propagating along most axes through the crystal. Accordingly, light propagating along these axes will experience different refractive indices depending on its polarization and angle of incidence to the crystal, possibly inducing polarization dependent loss (PDL) and polarization mode dispersion (PMD). Nevertheless, if light propagates in a direction parallel to the c or z axis in the crystal, it will not appear birefringent, since the refractive index will be same or substantially the same for all polarizations. That is, the polarizaiton axis will always be perpendicular to the c axis of the crystal.

However, the free (i.e. unconstrained quartz substrate without any thin films deposited thereon) thermal expansion of quartz perpendicular to the c axis is relatively high ($14.4 \times 10^{-6\circ}$ C.$^{-1}$). Thus, the quartz substrate consistent with an aspect of the present invention has a free thermal expansion sufficient to offset any temperature-related thickness and/or refractive index variations of the deposited thin films. As a result, temperature-related wavelength shifts of the filter are significantly reduced, in particular over a range of wavelengths used in optical communications (e.g. 1270 nm to 1670 nm).

Figure 1:
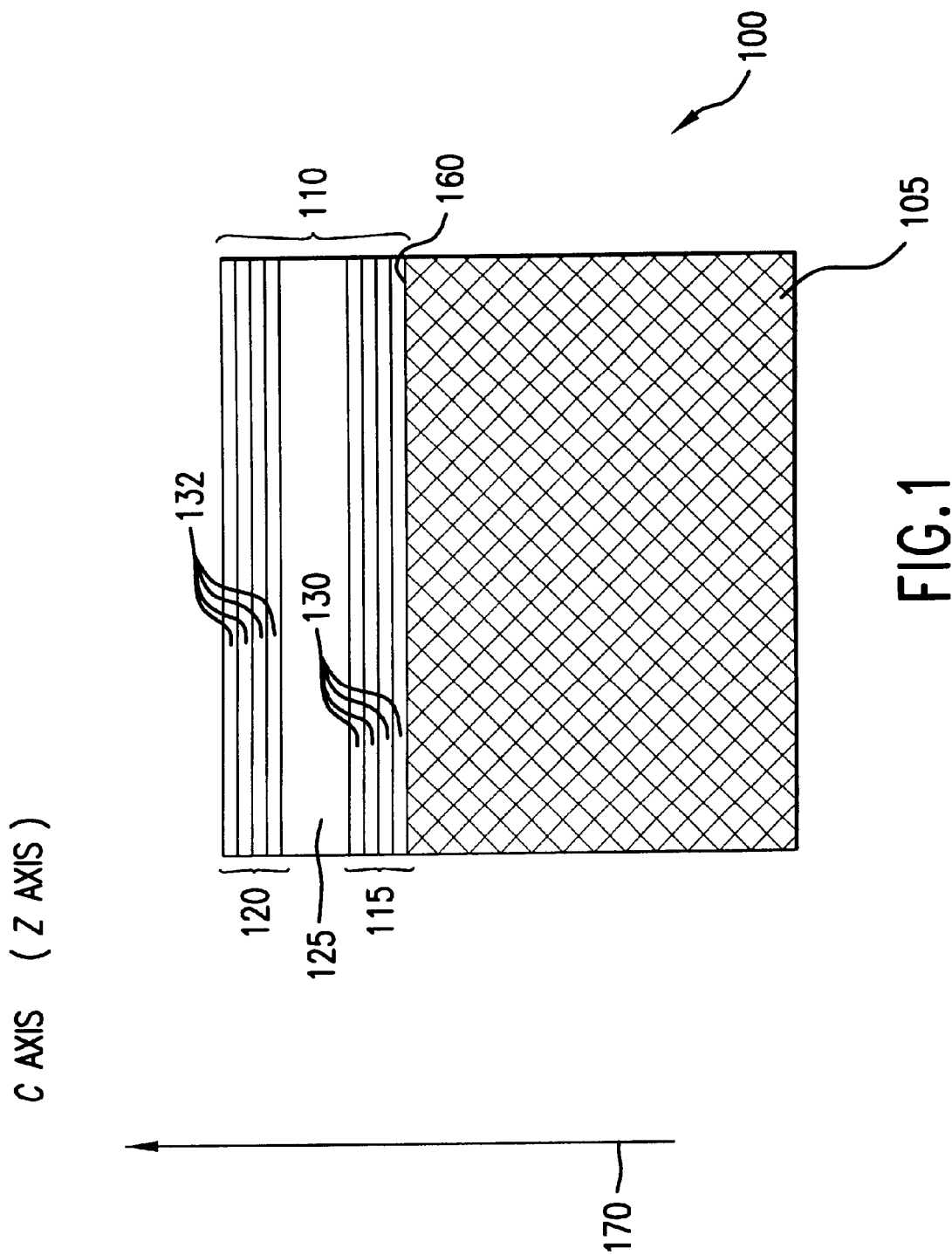
FIG. 1 illustrates a cross-sectional view of an optical filter consistent with an aspect of the present invention.

Turning to the drawings in which like reference characters indicate the same or similar elements in each of the several views, FIG. 1 illustrates an optical filter 100 including a quartz substrate 105 and a reflective layer 110. Reflective layer 110 includes a first and second mirror layers 115 and 120, and a spacer layer 125 provided therebetween. As generally understood, mirror layers 115 and 120 include pluralities of dielectric thin films or layers 130 and 132, respectively. These layers are often formed from tantalum pentoxide and silicon dioxide, or other suitable dielectric materials, all of which adhere well to quartz.

As further shown in FIG. 1, reflective layer 110 is deposited on a primary surface 160 of substrate 105. For reasons discussed in greater detail below, a normal direction to surface 160, as indicated by arrow 170, is preferably oriented parallel to a c axis of quartz crystal substrate 105. The c axis is thus preferably perpendicular to the primary surface of the substrate and the thin film layers deposited thereon.

Figure 2:
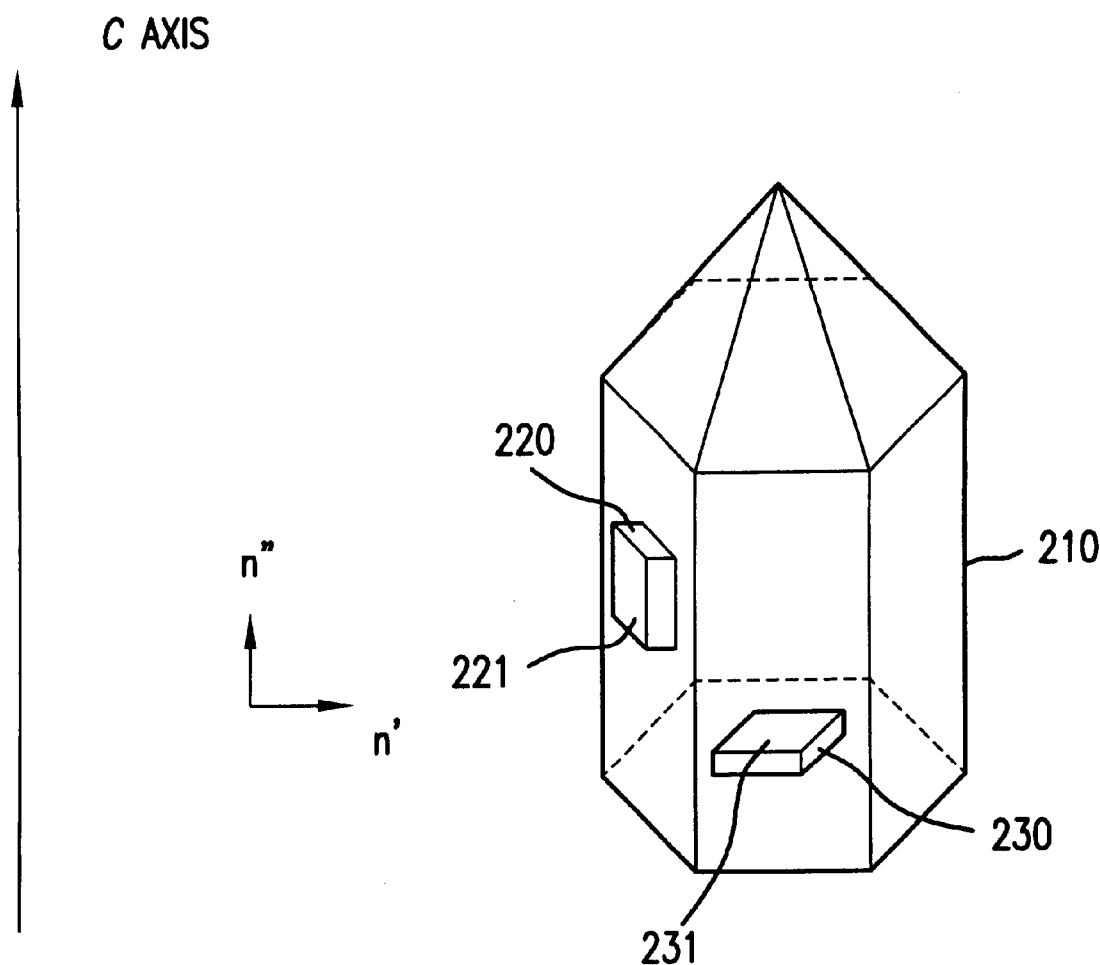
FIG. 2 illustrates substrates cuts from different portions of a quartz crystal.

FIG. 2 illustrates two substrates, 220 and 230, which can be cut from quartz crystal 210. The optical properties of quartz are such that light incident to primary surface 221 of substrate 220 has polarization components that are parallel to the c axis, and experiences different refractive indices n' and n" in the orthogonal directions in the plane of surface 221. Accordingly, substrate 220 is considered birefringent, and can introduce unwanted polarization effects, such as PDL and PMD.

Substrate 230, however, is cut so that the normal to primary surface 231 is parallel to the c axis. Thus, light incident to surface 231 along the normal does not have polarization components parallel to the c axis, and the refractive index for any polarization direction within the plane of surface 231 is the same. Light traveling normal to the surface of substrate 230 does not experience birefringence, and deleterious polarization-related effects do not arise.

Substrate 230, however, has a relatively high coefficient of thermal expansion in a lateral direction relative to the deposited thin films. Accordingly, in proportion to its relative thickness, substrate 230 will effectively "stretch" thin films deposited thereon with increasing temperature. If the substrate is made very thin, the films will be substantially unrestrained by the substrate, and will expand more nearly according to their inherent thermal expansion. In any case, the films will be deformed under varying thermal conditions, causing the reflected or transmitted wavelengths through the films to change as well.

Figure 3:
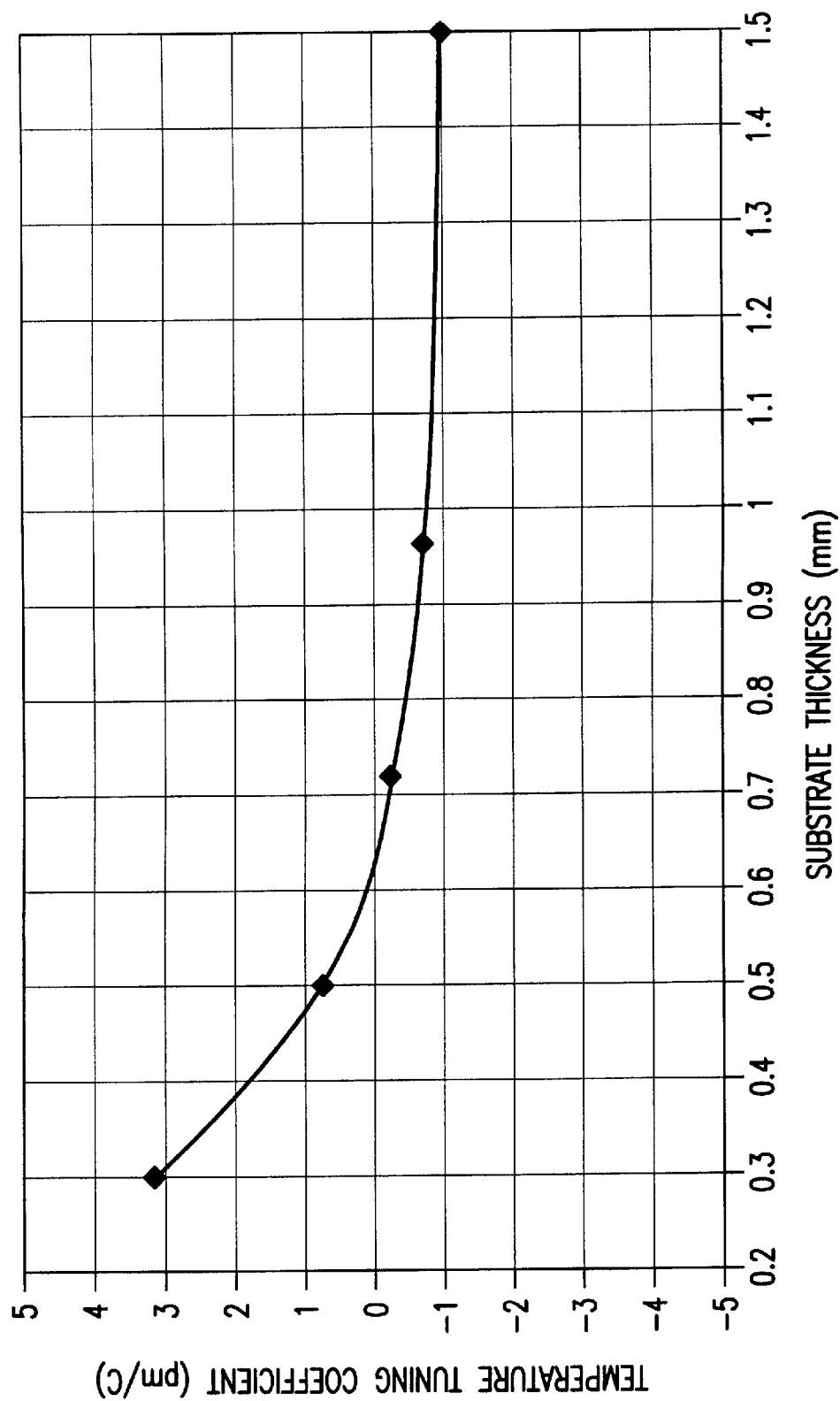
FIG. 3 illustrates a plot of temperature tuning coefficient vs. substrate thickness.

FIG. 3 is a plot illustrating quantitatively temperature-dependent center wavelength shift, expressed as a temperature tuning coefficient in units of picometers/° C., as a function of substrate thickness. The temperature tuning coefficient is a measure of the center wavelength dependence on temperature. If the temperature tuning coefficient is relatively large, the center wavelength will vary substantially with temperature. On the other hand, a small tuning coefficient will yield small changes in center wavelength with temperature. In any event, the temperature tuning coefficient should be zero or approximately equal to zero to minimize any variation in the center wavelength due to temperature (i.e., the center wavelength is substantially independent of temperature). This can occur if the substrate is thinned to have an exemplary substrate thickness of about 0.65 mm. In which case, the substrate is thick enough to stretch the thin films to offset temperature-related changes in optical thickness (defined as refractive index x physical thickness) of the films, but it is not so thick that it overcompensates these changes.

The above-described thickness of 0.65 mm is exemplary, and is suitable for thin films comprising 100–200 layers of silicon dioxide and tantalum pentoxide and having thicknesses of about 800 nm (half wave) and 400 nm (quarter wave). Other materials or film thicknesses may require different quartz substrate thicknesses to compensate for temperature-related shifts in the center wavelength.

After the substrate is cut, the primary surface is appropriately oriented in a sputtering chamber, for example, to receive a plurality of thin films that will make up the quarter and half-wave layers. The films are then successively deposited in a known manner.

Figure 4:
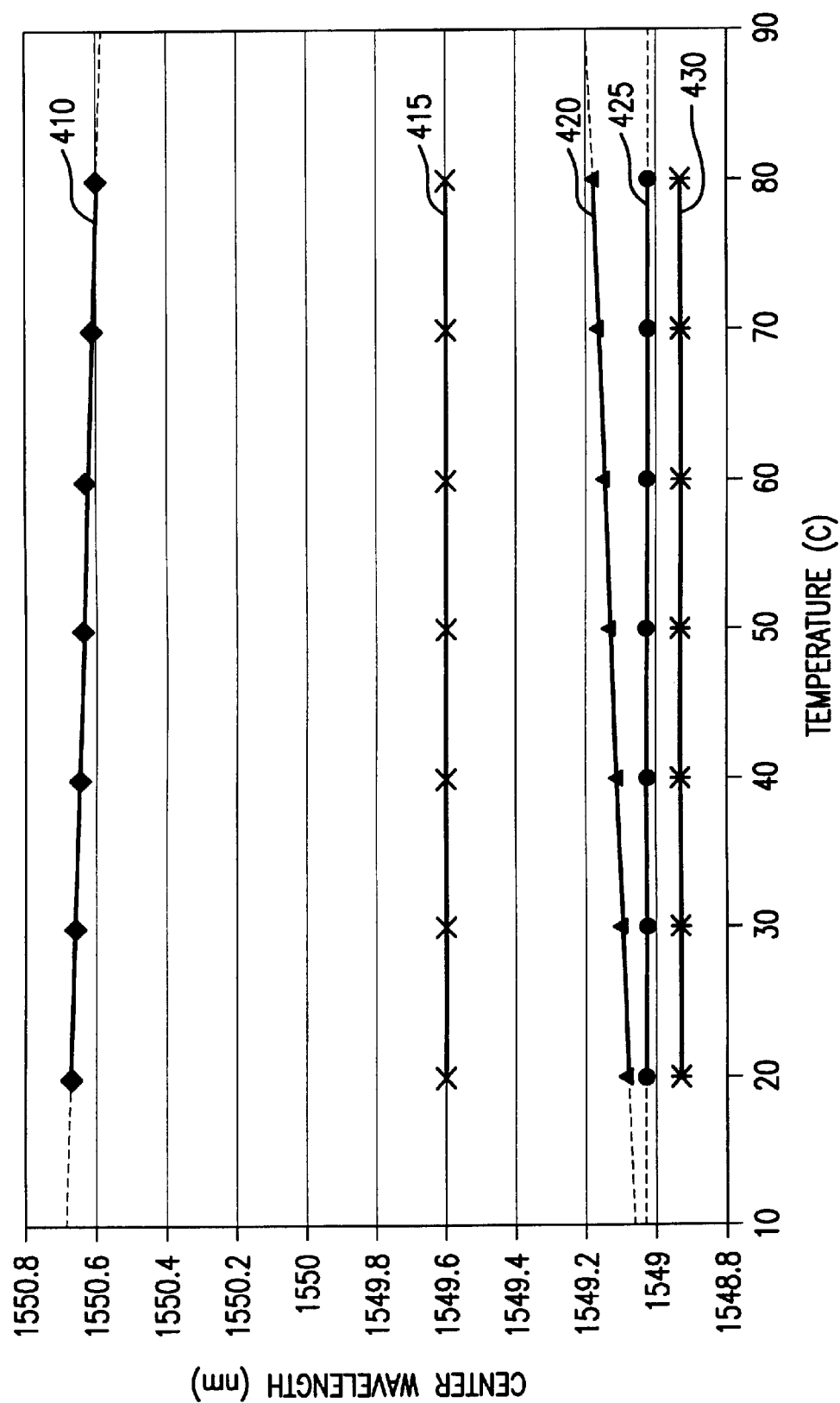
FIG. 4 illustrates plots of center wavelengths vs. temperature for different filters consistent with an aspect of the present invention.

FIG. 4 illustrates plots 410, 415, 420, 425 and 430 of center wavelength as a function of temperature for five filters consistent with the present invention. Plots 410, 415, 425 and 430 show that the center wavelength is substantially independent of temperature, and does not vary by more than 0.1 nm over a temperature range of 20° to 80° C. Moreover, center wavelengths associated with plot 415, for example, vary less than 0.025 nm over this temperature range.

Figure 5:
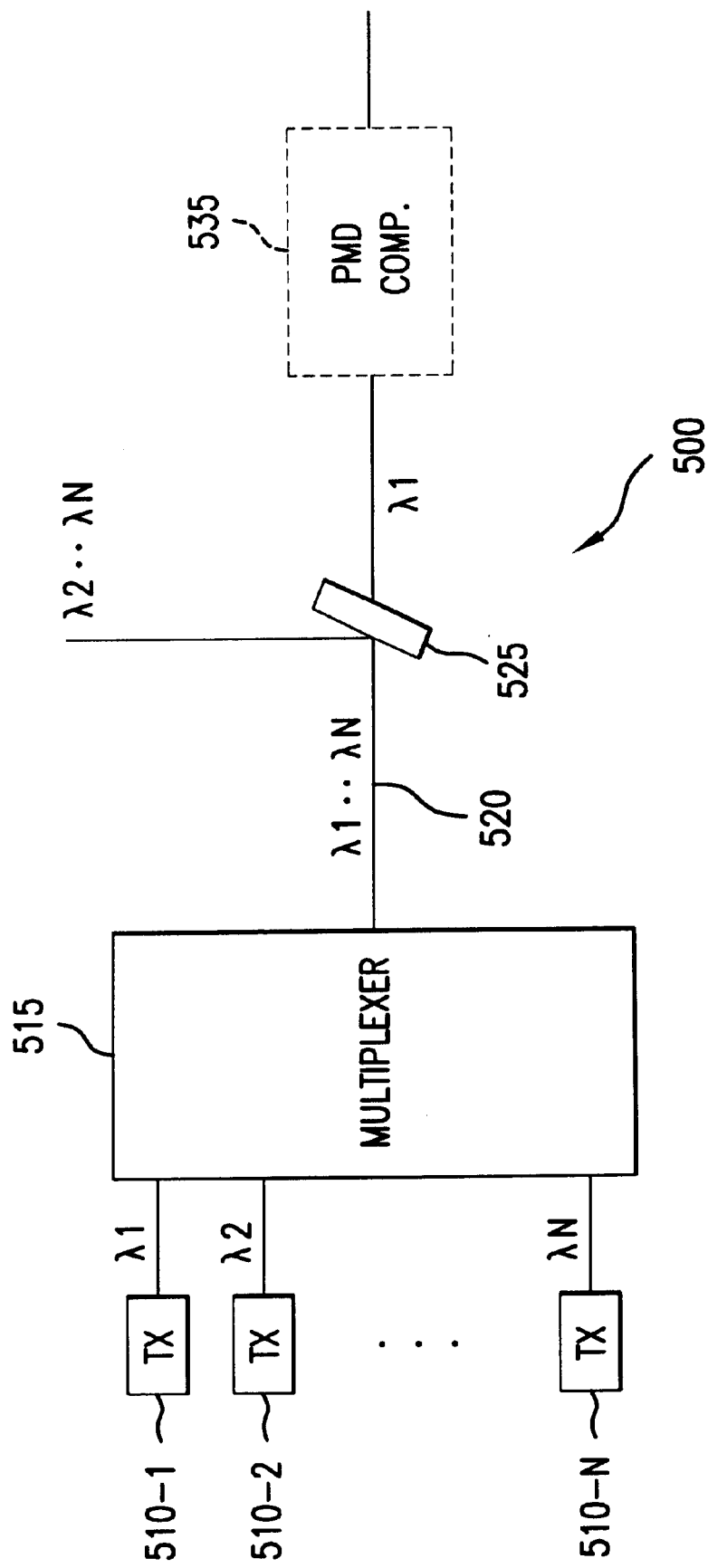
FIG. 5 illustrates a wavelength division multiplexed optical communication system consistent with a further aspect of the present invention.

FIG. 5 illustrates a portion of a wavelength division multiplexed (WDM) system 500 consistent with a further aspect of the present invention. System 500 includes a plurality of optical transmitters 510-1 to 510-N, each emitting a respective one of a plurality of optical signals, each at a corresponding one of wavelengths λ1 to λN. The optical signals are combined onto an optical communication path, such as fiber 520, by multiplexer 515. The optical signals next propagate on fiber 520 and impinge on filter 525, having a structure similar to that discussed above in reference to FIG. 1. Filter 525, in this example, is configured to optical signals at wavelength λ1, while reflecting remaining wavelengths λ2 to λN. Accordingly, signals at λ1 can be dropped, for example, from the group of signals supplied to filter 525, and supplied to appropriate circuitry (not shown) for detection and processing.

As indicated above, center wavelength of filter 525, λ1 in this instance, does not vary substantially with temperature. Accordingly, filter 525 reliably reflects optical signals at wavelength λ1 over a relatively wide temperature range, thereby improving system performance.

If system specifications permit a relatively small amount of polarization mode dispersion, the substrate may be cut such that the normal to the primary surface is not entirely parallel to the c axis. In which case, some birefringence may be present. If the birefringence is unacceptably high, however, a conventional PMD compensator, such as that described, for example, in U.S. Pat. No. 5,859,939, incorporated by reference herein, may be used to minimize any undesirable polarization-related effects. As further shown in FIG. 5, such a PMD compensator 535 may be coupled to filter 525 to reduce PMD in the λ1 optical signals output from the filter.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical filter, comprising:
   a single-crystal quartz substrate; and
   a reflective layer provided on said quartz substrate, said reflective layer having an associated center wavelength, said center wavelength being substantially independent of temperature.

2. An optical filter in accordance with claim 1, wherein said reflective layer further comprises:

a first mirror layer;
a second mirror layer; and
a spacer layer provided between said first and second mirror layers.

3. An optical filter in accordance with claim 2, wherein said first and second mirror layers each comprises a plurality of dielectric layers.

4. An optical filter in accordance with claim 1, wherein said quartz substrate has a primary surface and has an associated c axis crystallographic orientation, said c axis crystallographic orientation being substantially perpendicular to said primary surface of said quartz substrate.

5. An optical filter in accordance with claim 4, wherein said reflection layer is provided on said primary surface of said quartz substrate.

6. An optical filter in accordance with claim 1, wherein said quartz substrate has a primary surface and has an associated c axis crystallographic orientation, which is aligned in a direction other than a normal direction to said primary surface of said quartz substrate.

7. An optical filter in accordance with claim 1, wherein said quartz substrate has a primary surface, a first refractive index of said quartz substrate in a first direction in said primary surface being equal to a second refractive index of said quartz substrate in a second direction different than said first direction in said primary surface.

8. An optical filter in accordance with claim 7, wherein said reflection layer is provided on said primary surface.

9. An optical filter in accordance with claim 1, wherein said center wavelength varies less than 0.2 nm over a temperature range of 20° to 80° C.

10. An optical filter in accordance with claim 9, wherein said reflective layer further comprises:
a first mirror layer;
a second mirror layer; and
a spacer layer provided between said first and second mirror layers.

11. An optical filter in accordance with claim 10, wherein said first and second mirror layers each comprises a plurality of dielectric layers.

12. An optical filter in accordance with claim 9, wherein said substrate has a primary surface and has an associated c axis crystallographic orientation, said c axis crystallographic orientation being substantially perpendicular to said primary surface of said substrate.

13. An optical filter in accordance with claim 12, wherein said reflection layer is provided on said primary surface of said quartz substrate.

14. An optical filter in accordance with claim 9, wherein said substrate has a primary surface and has an associated c axis crystallographic orientation, which is aligned in a direction other than a normal direction to said primary surface of said substrate.

15. An optical filter in accordance with claim 9, wherein said substrate has a primary surface, a first refractive index of said quartz substrate in a first direction in said primary surface being equal to a second refractive index of said substrate in a second direction different than said first direction in said primary surface.

16. An optical filter in accordance with claim 15, wherein said reflective layer is provided on said primary surface.

17. A method of manufacturing an optical filter, comprising the steps of:
orienting a primary surface of a quartz substrate to receive a plurality of dielectric layers; and
successively depositing each of said plurality of dielectric layers on said primary surface, each of said plurality of dielectric layers being oriented substantially perpendicular to a c axis crystallographic orientation of said quartz substrate.

18. A method in accordance with claim 17, further comprising a step of thinning said quartz substrate to have a thickness, said thickness being selected such that a temperature tuning coefficient associated with said filter is substantially zero.

19. A method in accordance with claim 17, further comprising a step of thinning said quartz substrate to a thickness, said thickness being selected such that a center wavelength associated with said filter is substantially temperature independent.

20. A method in accordance with claim 19, wherein said center wavelength varies less than 0.1 nm over a temperature range of 20° to 80° C.

21. A wavelength division multiplexed optical communication system, comprising:
a plurality of optical transmitters, each of which emitting a corresponding one of a plurality of optical signals, each of said plurality of optical signals being at a corresponding one of a plurality of wavelengths;
an optical multiplexer coupled to said plurality of optitcal transmitters, said optical multiplexer supplying said plurality of optical signals to an optical communication path; and
an optical filter coupled to said optical communication path, said optical filter including:
a single-crystal quartz substrate; and
a reflective layer provided on said quartz substrate, said reflective layer having an associated center wavelength corresponding to one of said plurality of wavelengths, whereby at least one of said plurality of optical signals at said center wavelength is selected by said filter, said center wavelength being substantially independent of temperature.

22. A wavelength division multiplexed optical communication system in accordance with claim 21, wherein said reflective layer further comprises:
a first mirror layer;
a second mirror layer; and
a spacer layer provided between said first and second mirror layers.

23. A wavelength division multiplexed optical communication system in accordance with claim 22, wherein said first and second mirror layers each comprises a plurality of dielectric layers.

24. A wavelength division multiplexed optical communication system in accordance with claim 21, wherein said quartz substrate has a primary surface and has an associated c axis crystallographic orientation, said c axis crystallographic orientation being substantially perpendicular to said primary surface of said quartz substrate.

25. A wavelength division multiplexed optical communication system in accordance with claim 24, wherein said reflection layer is provided on said primary surface of said quartz substrate.

26. A wavelength division multiplexed optical communication system in accordance with claim 21, wherein said quartz substrate has a primary surface and has an associated c axis crystallographic orientation, which is aligned in a direction other than a normal direction to said primary surface of said quartz substrate.

27. A wavelength division multiplexed optical communication system in accordance with claim 21, wherein said quartz substrate has a primary surface, a first refractive index of said quartz substrate in a first direction in said primary surface being equal to a second refractive index of said quartz substrate in a second direction different than said first direction in said primary surface.

28. A wavelength division multiplexed optical communication system in accordance with claim 27, wherein said reflection layer is provided on said primary surface.

29. A wavelength division multiplexed optical communication system in accordance with claim 21, further comprising a polarization mode dispersion compensator coupled to said filter.

* * * * *